United States Patent

Tretiakoff et al.

(10) Patent No.: US 6,948,937 B2
(45) Date of Patent: Sep. 27, 2005

(54) PORTABLE PRINT READING DEVICE FOR THE BLIND

(76) Inventors: Oleg B. Tretiakoff, 9500 S. Ocean Dr., Islandia 2, Jensen Beach, FL (US) 34957; Andrea B. Tretiakoff, 9500 S. Ocean Dr., Islandia 2, Jensen Beach, FL (US) 34957

( * ) Notice: Subject to any disclaimer, the term of this patent is extended or adjusted under 35 U.S.C. 154(b) by 372 days.

(21) Appl. No.: 10/342,394

(22) Filed: Jan. 15, 2003

(65) Prior Publication Data

US 2003/0134256 A1 Jul. 17, 2003

(30) Foreign Application Priority Data

Jan. 15, 2002 (FR) .............................................. 02 00848

(51) Int. Cl.$^7$ .............................................. G09B 21/00
(52) U.S. Cl. ....................... 434/112; 434/113; 434/114; 434/116; 382/114
(58) Field of Search ...................... 434/112–115, 307 R, 434/365; 382/103, 114; 463/30; 623/6.63; 348/734; 345/169; 705/14, 39; 379/110.01; 725/78; 708/800; 709/203; 702/188; 361/680; 84/477 R

(56) References Cited

U.S. PATENT DOCUMENTS

| | | | | | |
|---|---|---|---|---|---|
| 5,305,197 | A | * | 4/1994 | Axler et al. ................... | 705/14 |
| 6,115,482 | A | * | 9/2000 | Sears et al. .................. | 382/114 |
| 6,169,789 | B1 | * | 1/2001 | Rao et al. .............. | 379/110.01 |
| 6,458,157 | B1 | * | 10/2002 | Suaning ..................... | 623/6.63 |
| 2002/0046638 | A1 | * | 4/2002 | Wright et al. ............. | 84/477 R |
| 2002/0078459 | A1 | * | 6/2002 | McKay ......................... | 725/78 |
| 2002/0165912 | A1 | * | 11/2002 | Wenocur et al. ............ | 709/203 |
| 2003/0035075 | A1 | * | 2/2003 | Butler et al. ................ | 348/734 |
| 2003/0067738 | A1 | * | 4/2003 | Rudd et al. ................. | 361/680 |
| 2004/0054623 | A1 | * | 3/2004 | Collins et al. ................ | 705/39 |
| 2004/0090424 | A1 | * | 5/2004 | Hurley et al. ............... | 345/169 |
| 2004/0102931 | A1 | * | 5/2004 | Ellis et al. .................. | 702/188 |
| 2004/0127284 | A1 | * | 7/2004 | Walker et al. ................ | 463/30 |
| 2004/0230636 | A1 | * | 11/2004 | Masuoka et al. ........... | 708/800 |

* cited by examiner

*Primary Examiner*—Joe H. Cheng
(74) *Attorney, Agent, or Firm*—Jacobson Holman PLLC

(57) ABSTRACT

A portable print reading device includes a high resolution digital camera to which the following additional functions have been added:

image centering by tactile or sound information, obtained from the analysis or real time video signals provided by the camera sensor, optical recognition of the characters contained in an image, conversion of recognized text into synthetic speech, conversion of recognized text into Braille, positioning of the reading cursor anywhere inside documents recognized and temporarily stored in the reading device memory: beginning of a page, a paragraph, a line, word search, etc., processing of raw images provided by the camera to allow the transfer of whole images or selected image parts to a tactile graphic array, to allow blind users to apprehend graphic elements of such an image, and control of the camera functions by electrical signals provided by the recognition of commands spoken by the user.

9 Claims, 1 Drawing Sheet

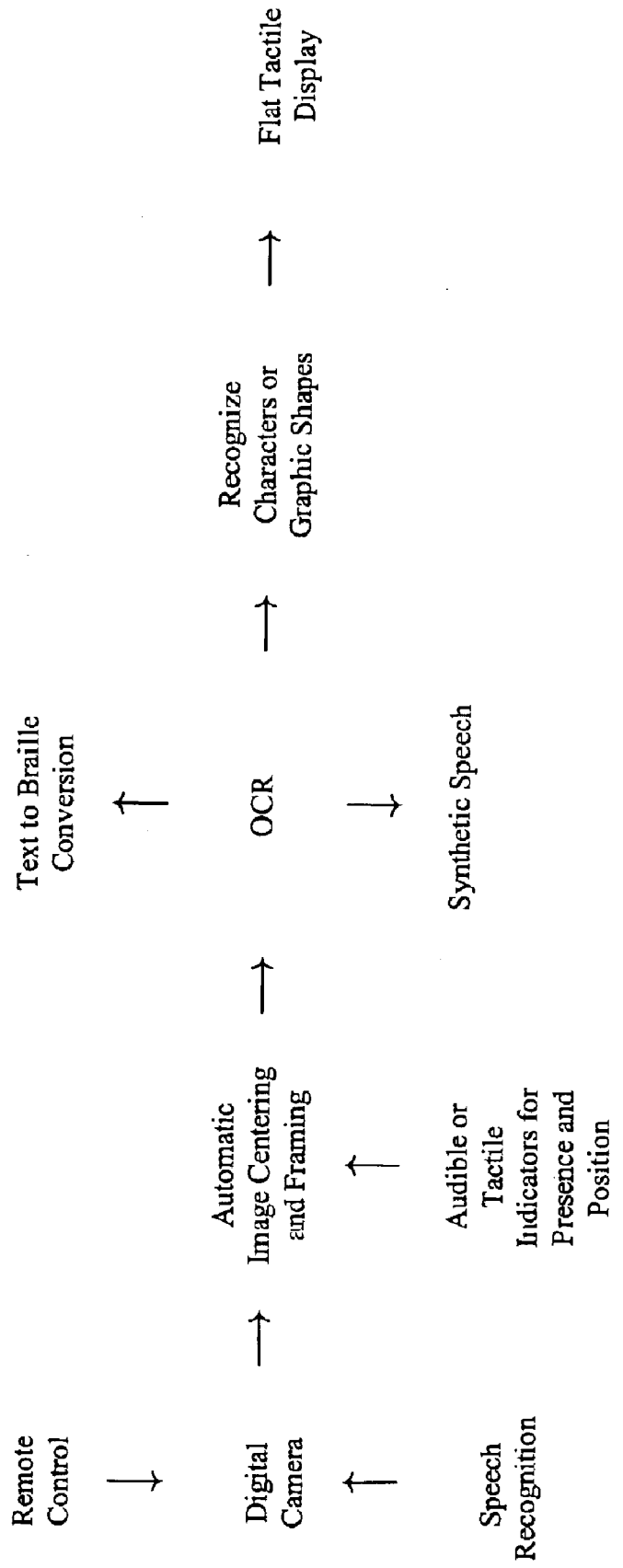

PORTABLE PRINT READING DEVICE FOR THE BLIND

FIELD OF THE INVENTION

The present invention concerns a portable device allowing blind or visually impaired individuals to read books, documents or more generally printed objects. The goal of the present invention is to provide blind or visually impaired individuals with a portable, compact, light and affordable device comprising all the functions needed to capture the image of an object, to recognize any text carried by this object and communicate this text to the user by synthetic speech or tactile output.

BACKGROUND OF THE INVENTION

To read a document with the devices currently available on the market, a blind user must first capture an image of the document by placing the document in a scanner connected to a computer, then convert the text contained in the image into text codes by using Optical Character Recognition software previously installed in the computer, then use additional software to convert the text codes into synthetic speech or to convert the text codes into Braille codes which can then be sent to a tactile display connected to the computer.

Such an outfit is expensive, heavy and very difficult to carry around. Moreover, a scanner is designed to read flat documents, not book pages, particularly not inside thick hard cover books.

A device allowing blind individuals to read by touch printed objects within their hand reach had been invented in the early seventies by Dr. John Linvill, Professor at Stanford University. This device, called "Optacon" (meaning optical to tactile converter) comprised:

a rudimentary monochrome camera, comprising an array of 144 photosensors arranged in 6 columns of 24 sensors each, outfitted with a small lens providing to the sensor a variable size image of the surface of an object placed against the camera, the object being illuminated by a tiny lamp located near the camera lens, connected by a multi-wire cable to a small easy to carry box containing on one hand, a tactile reading array comprising, as the camera, 144 tactile stimulators similarly arranged in 6 columns of 24 sensors each, with a vertical pitch of 1.25 mm and a horizontal pitch of 2.5 mm, and on the other hand the electronic circuits needed to amplify the signals provided by the camera sensors and to mechanically vibrate the tactile stimulators corresponding to an active photosensor, this meaning a photosensor looking at a part of the object with a luminosity below a chosen threshold for a black on white text, or above a chosen threshold for a white on black text.

This device generated a tactile vibrating image of the small area of an object against which its camera was placed and moved.

As its use required a long and difficult training, even for blind people very proficient in Braille reading, many special "Optacon" training schools were then created with the financial support of the United States Government.

A few years later, when this financial support was terminated, most of these schools were closed, slowing down considerably the diffusion of Optacons among new users.

The appearance of new technologies, as for example Braille tactile displays driven by electromagnetic or piezoelectric actuators, combined with the development of personal computers, later allowed blind individuals to gain access to a growing number of documents available in digital computer formats.

The appearance of personal scanners, then of optical character recognition software, later allowed blind individuals to gain access to printed documents and triggered the termination of new Optacon manufacturing.

Since the disappearance of the Optacon, twenty years after its invention, blind individuals are deprived of the services it alone could provide: direct reading of printed objects inaccessible with a scanner either because of their shape—for example food can labels—or because of their position—clothes labels for example—or simply because of the lack of portability of a scanner-computer ensemble.

SUMMARY OF THE INVENTION

Blind individuals are unanimous to express their desire for a device capable of providing essentially the same services as the defunct Optacon, but also to provide additional services like rapidly reading books or reading text carried by objects out of hand reach.

The most important function of such a device is the rapid capture of the image of an object with a resolution high enough to allow subsequent accurate recognition of the text it carries, while keeping the image acquisition procedure easy to perform by blind or visually impaired individuals.

Digital photographic cameras outfitted with color sensors carrying several million pixels are now becoming currently available and affordable. The image of a printed document provided by such cameras are of the quality needed by modern optical character recognition software.

Many of these cameras are outfitted with the functions needed by a blind user: variable focal length lens (zoom) to center and frame properly objects of different sizes at different distances, automatic focusing, automatic adjustment of exposure and color balance, object illumination by electronic flash when needed. Many are outfitted with a video output, allowing sighted users to properly center and frame the image of the object to photograph. Most of these cameras can perform sophisticated processing operations, like data compression, contrast and color balance corrections on the raw images captured by their sensor. To that effect, they carry powerful microprocessors and large memories to store images as well as processing software.

All of them can transfer data to and from external devices via their modern communication port(s) and often carry a built-in microphone and a tiny loudspeaker. One may expect a continuous growth of their capabilities in the future. These cameras therefore constitute a good starting base for the creation of the portable reading device, object of the present invention.

The object of the present invention is realized by a single device with extended capabilities, in spite of its small size and low weight. Among the objects which could be read by a user carrying such a device, for example with a shoulder strap like any other photographic camera, would be, for example:

labels on food cans or other packages, labels on clothes, menus displayed or provided by restaurants, streets and building names, information displayed on office doors, traffic information panels in airports and ground transportation terminals, and operating instructions and information on appliances or automatic goods distributors.

These and other objects of the invention, as well as many of the intended advantages thereof, will become more readily apparent when reference is made to the following description taken in conjunction with the accompanying drawing.

BRIEF DESCRIPTION OF THE DRAWING

The FIGURE schematically illustrates equipment added to a digital camera to make the camera function as a portable print reading device for the blind.

DETAILED DESCRIPTION OF THE PREFERRED EMBODIMENTS

A first goal of the present invention is to outfit an "off the shelf" digital camera with the functions and the software required to convert the camera into a portable print reading device for blind and visually impaired individuals.

Another goal of the present invention is to allow the new portable print reading device to benefit immediately from the continuing improvements of "off the shelf" digital camera performances and affordability resulting from their market many times larger than the blind or visually impaired market.

What are the additional functions and software needed by a digital camera to become a portable print reading device for blind or visually impaired individuals?

First of all an automatic image centering and framing (size adjustment) function which will use either the data continuously provided by the camera sensor or the data sent to the camera LCD display, or the video signal generated from these data by the camera circuits to detect the presence and the position of the document or object borders and provide to the user through audible or tactile means clues which will help achieve image centering and framing without actually seeing this image as a sighted user would.

Second, naturally, a character recognition software (OCR) which can transfer its results in real time, either to a synthetic speech software driving either the camera built-in speaker or audio output, or to a text to Braille conversion software, driving the camera communication port.

Third, for images comprising characters or graphic shapes which cannot be recognized by the OCR software, software allowing the user to select a rectangular section of the image and resample this section, either raw or after some kind of preprocessing, to match the number of pixels available on a tactile graphic array connected to the camera communication port.

Next, to make the Braille output and tactile graphic output function more readily accessible to the user, the camera LCD visual display could be supplemented by a flat tactile display capable of showing both Braille and graphics, whenever such a display, as described in patent application Ser. No. 10/269,041, filed Oct. 11, 2002, and hereby incorporated by reference in its entirety, becomes available.

Finally, it is necessary to replace the tiny controls carried by the camera which are difficult to use for blind people, either by a pocket size remote control unit designed for blind users, or by speech recognition software combined with a set of spoken commands to control both the basic camera functions and the added reading device functions.

In summary, the goal of the present invention is to transform a currently available affordable object, the digital camera, into a kind of "artificial eye" which can analyze and interpret image data, until new biomedical achievements allow the creation of true implantable vision organs. The invention basically comprises the following elements:

a digital camera outfitted with at least the following elements and functions:

color sensor with at least 4 millions active pixels, variable focal length lens providing an angular field of view from 20 to 60 degrees when focused at infinity, automatic lens focusing by electric signals from infinity to 30 cm for the maximum focal length and to 4 cm for the minimum focal length (macro focus), automatic exposure adjustment (amount of light received by the sensor) by electric signals controlling the lens aperture, combined with manual adjustment of the exposure duration, or vice-versa (choice of aperture or exposure time priority), automatic adjustment of the color balance, real time conversion of the electrical data provided by the sensor, during the camera adjustment operations, into electrical signals for an LCD display and into video standard video signals, digital processor capable of performing the above real time conversions, communication port for data transfer from and to the camera, video signal output port, digital processor capable of performing on raw images in real time—a few seconds—various operations like compression into standard formats, conversion to different resolutions, random access memory (RAM) of a size allowing the storage of all the data required for image data processing, non-volatile memory, of the "flash" or "eeprom" type, allowing the storage of all the software required for image data processing and camera controls, user replaceable non-volatile memory, of the "compact flash" or "memory stick" type, for example, allowing the storage of at least one raw image at the camera maximum resolution, electronic flash light with automatic exposure control for object illumination in low light conditions, microphone, loudspeaker and associated analog to digital, digital to analog and amplifications circuits, user replaceable batteries, preferably rechargeable, allowing the operation of the camera for several hours, electronic converters and regulators providing the appropriate voltage and power to the various electric elements of the camera, means for the control by the user of all the camera functions listed above, design allowing the remote control, by electrical signals sent through its communication port(s), of the essential camera functions: lens zooming and focusing, image capture, means for adding to the digital camera the following functions required for its conversion into a reading device:

image centering by means of tactile or sound information, obtained from the analysis of real time video signals provided by the camera sensor, optical recognition of the characters contained in an image, conversion of recognized text into synthetic speech, conversion of recognized text into grade one or grade two Braille, positioning of the reading cursor anywhere inside documents recognized and temporarily stored in the reading device memory: at the beginning of a page, a paragraph, a line, word search, etc., processing of raw images provided by the camera to allow the transfer of whole images or selected image parts to a tactile graphic array, to allow blind users to apprehend graphic elements of such an image, and control of the camera functions by means of electrical signals provided by the recognition of commands spoken by the user.

The above description concerns a device in which:

on one hand, the power of the processor(s) present in the camera is sufficient to perform at a sufficient speed, both the original camera functions and the additional functions needed for its conversion into a reading device, and on the other hand, the size of memories present in the camera is sufficient to store the software needed to perform these additional functions.

The present invention also concerns a device in which:

either, the power of the processor(s) present in the camera is not sufficient to perform at a sufficient speed, both the original camera functions and the additional functions needed for its conversion into a reading device, and therefore this power is increased, either by replacing the processor(s) or by adding a new processor to the device in a way compatible with the camera design, or, the size of memories present in the camera is not sufficient to store the software needed to perform these additional functions and therefore is increased, either by replacing these memories by larger ones or by adding memory to the device in a way compatible with the camera design.

The present invention also concerns a device in which a tactile display is either added to, or replaces the camera LCD display, this tactile display meeting the camera size limitations.

The present invention also concerns a device in which all or a fraction of the added functions and elements are contained in an enclosure outside the digital camera, this enclosure becoming the device remote control unit when it contains the necessary control keys and circuits.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

We claim:

1. A device allowing blind or visually impaired people to read books, documents and other objects carrying printed text, located nearby or at a distance, the device comprising:

a digital camera including at least the following:

color sensor with at least 4 million active pixels, variable focal length lens providing an angular field of view from 20 to 60 degrees when focused at infinity, automatic lens focusing from infinity to 30 cm for a maximum focal length and to 4 cm for a minimum focal length, automatic exposure adjustment, automatic adjustment of the color balance, real time conversion of electrical data to an LCD display and into video standard video signals, digital processor performing the real time conversion, communication port for data transfer from and to the camera, video signal output port, digital processor for performing compression of images into standard formats and conversion to different resolutions, random access memory of a size allowing storage of data required for image data processing, non-volatile memory allowing storage of software required for image data processing and camera controls, user replaceable non-volatile memory allowing storage of at least one raw image at the camera maximum resolution, electronic flash light with automatic exposure control for object illumination in low light conditions, microphone, loudspeaker and analog to digital, digital to analog and amplifications circuits, user replaceable batteries allowing the operation of the camera for several hours, electronic converters and regulators providing appropriate voltage and power to electric elements of the camera, control device for controlling of camera functions by the user, image centering by one of tactile and sound information, optical recognition of characters contained in an image, conversion of recognized text into at least one of synthetic speech and grade one or grade two Braille, positioning of a reading cursor anywhere inside documents recognized and temporarily stored in the memory, processing of raw images provided by the camera to allow the transfer of at least selected image parts to a tactile graphic array, to allow blind users to apprehend graphic elements of the raw images, and control of the camera functions by electrical signals provided by recognition of commands spoken by the user.

2. Device according to claim 1, wherein:

the power and the memories present in the camera are sufficient to perform both the camera functions and conversion of images by a reading device.

3. Device according to claim 1, wherein the camera contains a second digital processor which is compatible with the camera and is more powerful than the first digital processor.

4. Device according to claim 3, wherein the camera contains additional memories.

5. Device according to claim 1, wherein the camera contains a second digital processor which is compatible with the camera.

6. Device according to claim 5, wherein the camera contains additional memories.

7. Device according to claim 1, wherein the camera LCD display is complemented by a tactile display.

8. Device according to claim 1, wherein a tactile display replaces the LCD display.

9. Device according to claim 1, wherein an enclosure is located outside the digital camera and contains at least one of additional memory and additional processing power.

* * * * *